(12) United States Patent
Wang et al.

(10) Patent No.: US 10,740,881 B2
(45) Date of Patent: Aug. 11, 2020

(54) DEEP PATCH FEATURE PREDICTION FOR IMAGE INPAINTING

(71) Applicant: Adobe Inc., San Jose, GA (US)

(72) Inventors: Oliver Wang, Seattle, WA (US);
Michal Lukac, San Jose, CA (US);
Elya Shechtman, Seattle, WA (US);
Mahyar Najibikohnehshahri, Hyattsville, MD (US)

(73) Assignee: Adobe Inc., San Jose, CA (US)

( * ) Notice: Subject to any disclaimer, the term of this patent is extended or adjusted under 35 U.S.C. 154(b) by 171 days.

(21) Appl. No.: 15/935,994

(22) Filed: Mar. 26, 2018

(65) Prior Publication Data
US 2019/0295227 A1    Sep. 26, 2019

(51) Int. Cl.
*G06T 5/00*  (2006.01)
*G06K 9/62*  (2006.01)

(52) U.S. Cl.
CPC ............ *G06T 5/005* (2013.01); *G06K 9/6202* (2013.01); *G06K 9/6215* (2013.01); *G06T 2207/20081* (2013.01); *G06T 2207/20084* (2013.01)

(58) Field of Classification Search
CPC .... G06T 5/10; G06T 5/20; G06T 5/40; G06K 9/62; G06K 9/6201; G06K 9/621; G06K 9/6211; G06K 9/622; G06K 9/6215; G06K 9/6202
See application file for complete search history.

(56) References Cited

U.S. PATENT DOCUMENTS

| | | | |
|---|---|---|---|
| 2008/0137952 A1* | 6/2008 | Kokemohr | G06F 3/04845 382/173 |
| 2010/0164976 A1* | 7/2010 | Choe | H04N 5/2351 345/590 |
| 2010/0329533 A1* | 12/2010 | Omi | G06T 5/008 382/132 |

(Continued)

OTHER PUBLICATIONS

Pathak, Deepak, et al., "Context Encoders: Feature Learning by Inpainting", In Proceedings of the IEEE Conference on Computer Vision and Pattern Recognition, 2016, 9 pages.

(Continued)

*Primary Examiner* — Dwayne D Bost
*Assistant Examiner* — Stephen M Brinich
(74) *Attorney, Agent, or Firm* — Kilpatrick Townsend & Stockton LLP

(57) ABSTRACT

Techniques for using deep learning to facilitate patch-based image inpainting are described. In an example, a computer system hosts a neural network trained to generate, from an image, code vectors including features learned by the neural network and descriptive of patches. The image is received and contains a region of interest (e.g., a hole missing content). The computer system inputs it to the network and, in response, receives the code vectors. Each code vector is associated with a pixel in the image. Rather than comparing RGB values between patches, the computer system compares the code vector of a pixel inside the region to code vectors of pixels outside the region to find the best match based on a feature similarity measure (e.g., a cosine similarity). The pixel value of the pixel inside the region is set based on the pixel value of the matched pixel outside this region.

20 Claims, 13 Drawing Sheets

(56) References Cited

U.S. PATENT DOCUMENTS

| | | | | |
|---|---|---|---|---|
| 2013/0009980 A1* | 1/2013 | Gu | ............................ | G06T 5/00 |
| | | | | 345/611 |
| 2014/0375865 A1* | 12/2014 | Shroff | ....................... | G06T 5/00 |
| | | | | 348/333.12 |
| 2016/0260199 A1* | 9/2016 | Takahama | ............ | G06K 9/4661 |

OTHER PUBLICATIONS

Yang, Chao, et al., "High-Resolution Image Inpainting using Multi-Scale Neural Patch Synthesis", In Proceedings of the IEEE Conference on Computer Vision and Pattern Recognition, 2017, 9 pages.

Iizuka, Satoshi, et al., "Globally and Locally Consistent Image Completion.", ACM Transactions on Graphics, 2017, 14 pages.

Barnes, Connelly, et al., "PatchMatch: A Randomized Correspondence Algorithm for Structural Image Editing.", ACM Transactions on Graphic, 2009, 10 pages.

Barnes, Connell, et al., "The Generalized Patchmatch Correspondence Algorithm.", In European Conference on Computer Vision, 2010, 14 pages.

Darabi, Soheil, et al., "Image Melding: Combining Inconsistent Images using Patch-based Synthesis.", ACM Transactions on Graphics, 2012, 10 pages.

\* cited by examiner

DEEP PATCH FEATURE PREDICTION FOR IMAGE INPAINTING

TECHNICAL FIELD

The application relates to image inpainting—the process of reconstructing a part of an image. In an example, a neural network is trained and used to facilitate a patch-based approach for the image inpainting.

BACKGROUND

Image inpainting is the process of reconstructing a part of an image and has many applications in computer graphics and vision, such as photo restoration, object removal, content reshuffling, panorama stitching, and image style transfer. To illustrate, an image having a content hole can be reconstructed. Specifically, the image inpainting approximates the missing content and fills out the hole.

A number of existing approaches have been developed in the industry for the image inpainting. A first approach relies on a patch-based scheme. Under this scheme, missing content in a region (e.g., a hole) of the image is initialized and iteratively updated by matching it with known content in other regions of the image. The matching relies on patches between the missing and known regions. In this way, the missing content is patched from the known content.

More specifically, for each patch inside the region of missing content, a similar patch outside the region is found, where the similarity relates to current red, blue, green (RGB) estimates of the missing content and RGB values of the known content. The RGB estimates inside the region are updated based on the found similar patches and the search and update process is repeated until convergence.

The patch-based approach can provide high-resolution results for the missing content under certain scenarios. However, this approach tends to fail when the missing content is actually different from the known content and to over-blur the results. That is because, in the intermediate iterations, the RGB estimates inside the region are not accurate and consequently the predicted visual content it not yet sharp. Furthermore, the iterative process can be time-consuming and computationally burdensome given the number of iterations and the number patches and needed comparisons in each iteration.

To illustrate, consider an example of an image showing a house facade that includes a window and that is missing another window and a door. The "window hole" could be accurately patched by using content of the shown window. However, the "door hole" is less accurately patched because no door content is available from the image. In this case, the "door hole" may be inaccurately filled with the content of the shown window. Hence, the patch-based approach is typically limited to repeating known content elsewhere in the image and does not generate new content.

In another approach, deep learning is used. In particular, a neural network is trained to predict a missing region. The capability of the neural network to draw up content learned from its training data avoids the first limitation of the patch-based approach. However, the predicted results tend to be of low resolution and are limited to the specific training domains. For example, if the neural network is trained on faces, predicting the content of the "door hole" in the above example image is likely to be inaccurate. Hence, the deep learning approach is difficult to generalize beyond the specific training domain. Extending this approach to work on arbitrary images and to provide high resolutions results necessitates training over the entire space of plausible images and learning a huge number of parameters, which are not tractable.

SUMMARY

Embodiments for using deep learning to facilitate patch-based image inpainting are described. In an example, a computer system hosts a neural network. The computer system receives an image that includes a region of interest (e.g., a hole with missing content) and content outside the region of interest. The computer system generates a first patch centered around a first pixel inside the region of interest and a second patch centered around a second pixel outside the region of interest. By at least inputting the image to the neural network, the computer system generates a first code vector for the first pixel and a second code vector for the second pixel. The first code vector comprises features that are learned by the neural network and that are descriptive of the first patch. The computer system associates the first pixel with the second patch based on a similarity measure between the first code vector and the second code vector. Further, the computer system determines an overlapping patch that includes the first pixel. The overlapping patch is centered around a third pixel inside the region of interest and overlaps with the first patch. The third pixel is associated with a fourth patch centered around a fourth pixel outside the region of interest. By at least inputting the second patch and the fourth patch to the neural network, the computer system generates a pixel value for the first pixel based on a weighted combination of pixel values from the content in the second patch and the fourth patch. The weighted combination is learned by the neural network.

DETAILED DESCRIPTION

Figure 1:
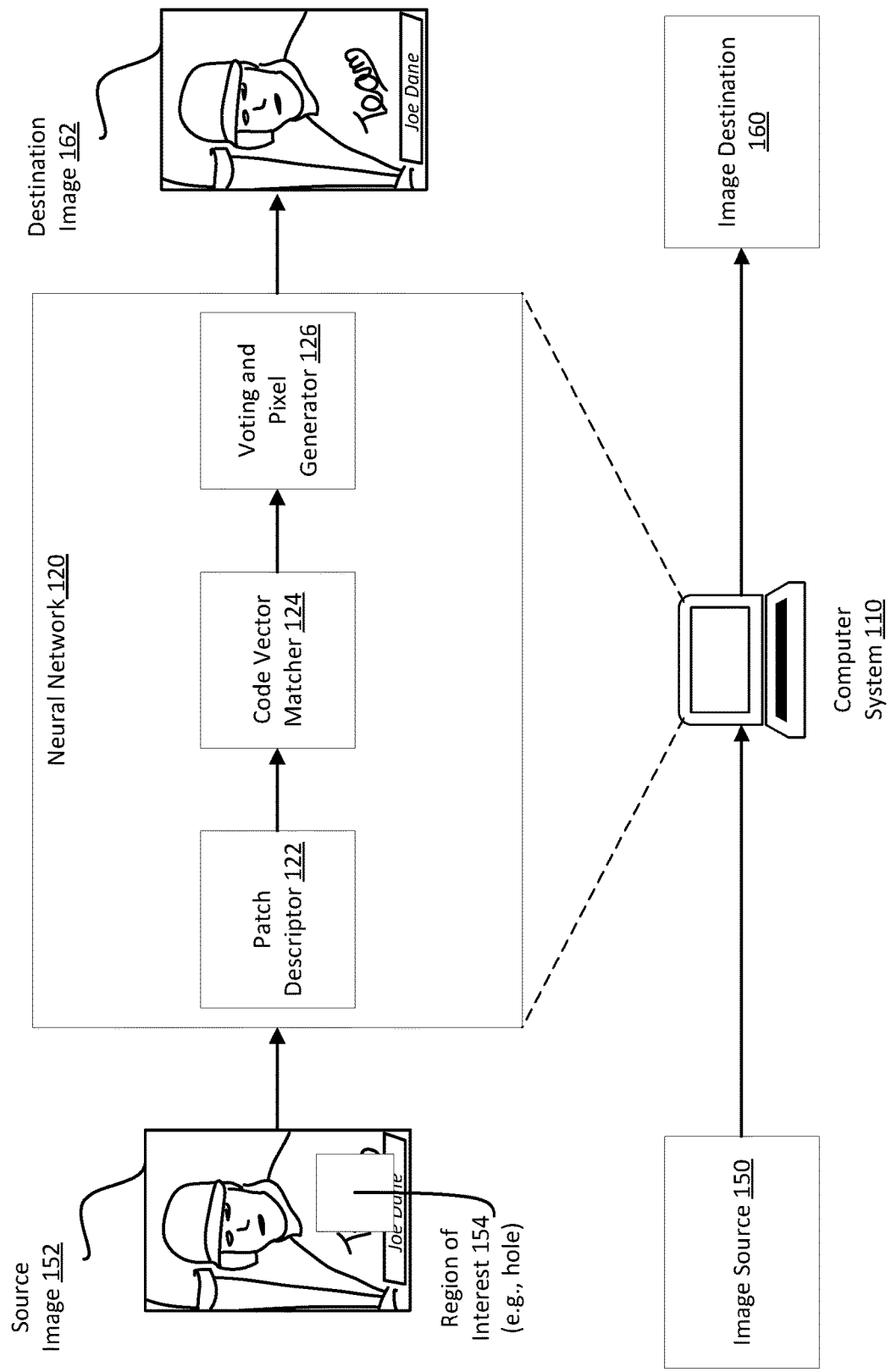
FIG. 1 illustrates an example computing environment for using deep learning in patch-based image inpainting, according to embodiments of the present disclosure.

Embodiments of the present disclosure are directed to, among other things, using deep learning for patch-based image inpainting. In an example, a neural network is trained to predict code vectors from patches in an image. A code vector contains features that are learned by the neural network and that are descriptive of a patch. Rather than matching patches based on an RGB similarity measure as in the existing patch-based approaches, code vectors associated with pixels inside an image region having missing content (referred to herein as "in-pixels") are matched with code vectors associated with pixels outside the image region (referred to herein as "out-pixels"). In this way, each in-pixel is associated with a number of out-pixels based on their similar features as learned by the neural network. For each in-pixel, its pixel value is computed based on the pixel values of the out-pixels associated therewith.

By combining deep learning with patch-based inpainting, the technological benefits of both worlds can be achieved at the same or even lower level of computationally complexity. In particular, high-resolution and smooth region filling becomes possible, even when the missing content is not available from the image and without an expensive training over a large number of domains. Instead, by relying on code vectors that describe the patches, the training of the neural network can be made less complex while still allowing the efficient capture of the needed visual information for reconstructing the patches. By matching the code vectors, each in-pixel is also associated with multiple out-pixels based on feature similarities of the corresponding patches. This matching allows to fill the region not based on some intermediary and iterative RGB values, but based on what the region will eventually look like, leading to significantly more accurate results in terms of quality of the region filling (e.g., resolution and smoothness).

The next example is provided for illustrative purposes. In the interest of clarity of explanation, it is described in connection with a single in-pixel. However, the example similarly applies to all remaining in-pixels (e.g., to filling out the entire image region that is missing content). In this example, a computer system hosting a neural network receives an image. For each pixel, the computer system generates a K×K×3 patch centered around the pixel. The first "K" dimension refers to the height of the patch, the second "K" dimension refers to the width of the patch (in this example, a square patch). And the third "3" dimension refers to the three RGB values of the K×K pixels contained in the patch. The neural network is used to generate a d×1 code vectors for each patch. "d" refers to the number of features learned by the neural network and "1" refers to the fact that this is a one dimensional vector with the "d" features.

The computer system compares the code vector for an in-pixel to code vectors of out-pixels by using a cosine similarity measure to find the best match. Accordingly, the in-pixel is associated with an out-pixel given the best matched code vectors. That out-pixel is associated with a patch centered around it. Accordingly, the in-pixel becomes associated with that patch. The RGB values of the in-pixel can be computed based on the known content of this associated patch.

To compute the RGB values of the in-pixel, the neural network can be further used. In particular, the in-pixel is also found in overlapping patches, each of which are centered around another in-pixel. For instance, if each patch is a 7×7×3 patch, the in-pixel is found in one patch centered around it and in forty-eight other overlapping patches (for a total of 7×7=49 patches). As above, each of the other in-pixels (e.g., forty-eight in-pixels) are associated with an out-pixel (e.g., forty-eight out-pixels). Based on the overlapping patches, the in-pixel becomes additionally associated with these out-pixels (e.g. the forty-eight out-pixels). Accordingly, the in-pixel is associated with a total of K×K out-pixels (e.g., forty-nine out-pixels), each of which has a patch centered around it. These patches (for a total of K×K, such as forty-nine) are input to the neural network. In turn, the neural network outputs the pixel value of the in-pixel based on weighted combinations of the content in these patches.

FIG. 1 illustrates an example computing environment for using deep learning in patch-based image inpainting, according to embodiments of the present disclosure. The bottom part of the figure shows the various components of the environment, while the top part shows modules that are hosted on such components.

As illustrated, a computer system 110 is communicatively coupled with an image source 150 and an image destination 160. The computer system 110 hosts a neural network 120 that provides deep learning functionality in support of the patch-based image inpainting. The image source 150 represents a computing resource from which images are available, referred to herein as source images. Some of the source images include regions of missing content and can be processed through the neural network 120 to generate the missing content and fill out the regions. The image destination 160 represents a computing resource to which processed images are sent or stored. These images are referred to as destination images.

In an example, the image source 150 and the image destination 160 are components of the computer system 110. For instance, the computer system 110 is an end user device, such as a tablet, a laptop, or a desktop computer. The memory of this end user device can store the source images and the destination images and, thus, represents both the image source and image destination 160.

In another example, the image source 150 and the image destination 160 are not components of the computer system 110. For instance, the computer system 110 is a cloud-based system that offers an image inpainting service. The image source 150 can be an end user device that uploads the image sources to this inpainting service. The destination images are then sent back from the cloud to the end user device or to some other identified computing device or online service.

Generally, the neural network 120 may include multiple modules to support the image inpainting, some of which may be a neural network on their own. As illustrated, the neural network 120 includes a patch descriptor 122, a code vector matcher 124, and a voting and pixel generator 126. In an example, the patch descriptor 122 is a neural network trained to generate code vectors in response to receiving a source image. Each code vector corresponds to a patch centered around a pixel in the image and describes features of the patch, where these features are learned by the patch descriptor 122. Further description of this neural network is provided in FIG. 3. The voting and pixel generator 126 is also another neural network. This neural network is trained to generate a pixel value for a pixel in a missing region of source image in response to receiving patches associated with the pixel. Further description of the voting and pixel generator neural network is provided in FIG. 4.

The code vector matcher 124 sits between the patch descriptor 122 and the voting and pixel generator 126. It translates the output of the patch descriptor 122 into an input to the voting and pixel generator 126. In particular, the output of the patch descriptor 122 is a code vector search space (e.g., a search space made of code vectors). The code vector matcher 124 matches the code vector of an in-pixel with a code vector of an out-pixel based on a feature similarity measure, such as one that use a cosine similarity measure, a Euclidean distance measure, or any measure for comparing how similar vectors are. The code vector matcher 124 also determines the overlapping patches that contain the in-pixel, the center in-pixel of each of such patches, the corresponding matched out-pixels and their patches, and associates these corresponding matched patches with the in-pixel. The corresponding matched patches for the in-pixel become input to the voting and pixel generator 126.

As illustrated, a source image 152 is available from image source 150 and is input to the neural network 120. This source image contains a region of interest 154, such as a hole that is missing content. For instance, while the source image 152 is for a baseball player, the region of interest may be missing a part of the player's jersey and name. The neural network 120 processes this image and uses patch-based inpainting, as further described in connection with the next figures, to predict the missing part of the jersey and the missing text of the player's name. The region of interest 154 is filled out with the predicted content, resulting in a destination image 162. This destination image 162 represents an image that is a synthesized by the neural network 120 such that to include the predicted content and to avoid any region without content. The destination image 162 is sent to the image destination 160. For instance, while the source image 152 is received from an end user device, the destination image 162 is sent back to the end user device and is presented on that device at a graphical user interface.

In the interest of clarity of explanation, embodiments of the present disclosure may be described in connection with filling content in a hole of an image (e.g., hole filling). However, the embodiments are not limited as such and similarly apply to any other image synthesis application that relies on patch-based inpainting such as image retargeting photo restoration, object removal, content reshuffling, panorama stitching, and image style transfer. For example, within the content of image retargeting, the aspect ratio of the image is iteratively changed from one ratio to another one. At each iteration, patches are used to maintain the content in regions of the image at an intermediary aspect ratio. The neural network 120 is usable at each of such iterations to provide the content.

Figure 2:
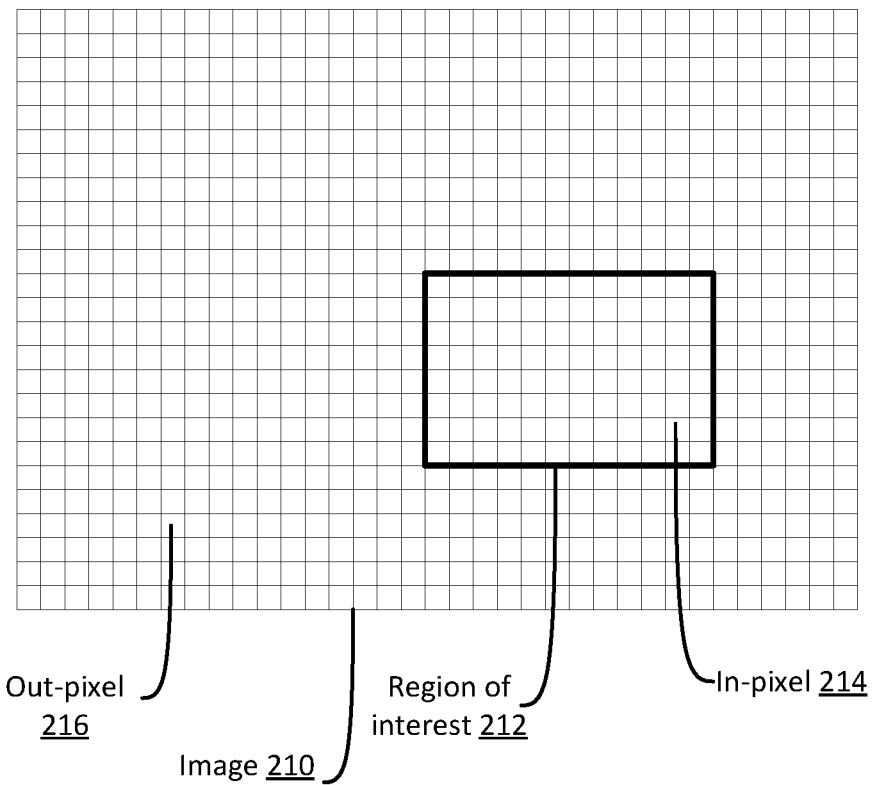
FIG. 2 illustrates an example of an image that contains a region of interest, according to embodiments of the present disclosure.

FIG. 2 illustrates an example of an image 210 that contains a region of interest 212, according to embodiments of the present disclosure. The image 210 includes a plurality of pixels organized in a grid, such that each pixel has (x, y) coordinates and takes visual properties (e.g., an RGB value). In an example, the region of interest 212 is a hole that is missing content. Pixels inside the region of interest 212 are referred to as in-pixels 214 (they can also be referred to as destination pixels or pixels in a destination region). Each in-pixel 214 has (x, y) coordinates but some or all of its visual properties, including its RGB value, are missing.

Pixels outside the region of interest 212 (and not falling in any other region of interest in the image 210) are referred to as out-pixels 216 (they can also be referred to as source pixels or pixels in a source region). Each out-pixel 216 has (x, y) coordinates and its visual properties, including its RGB value, are known.

Figure 3:
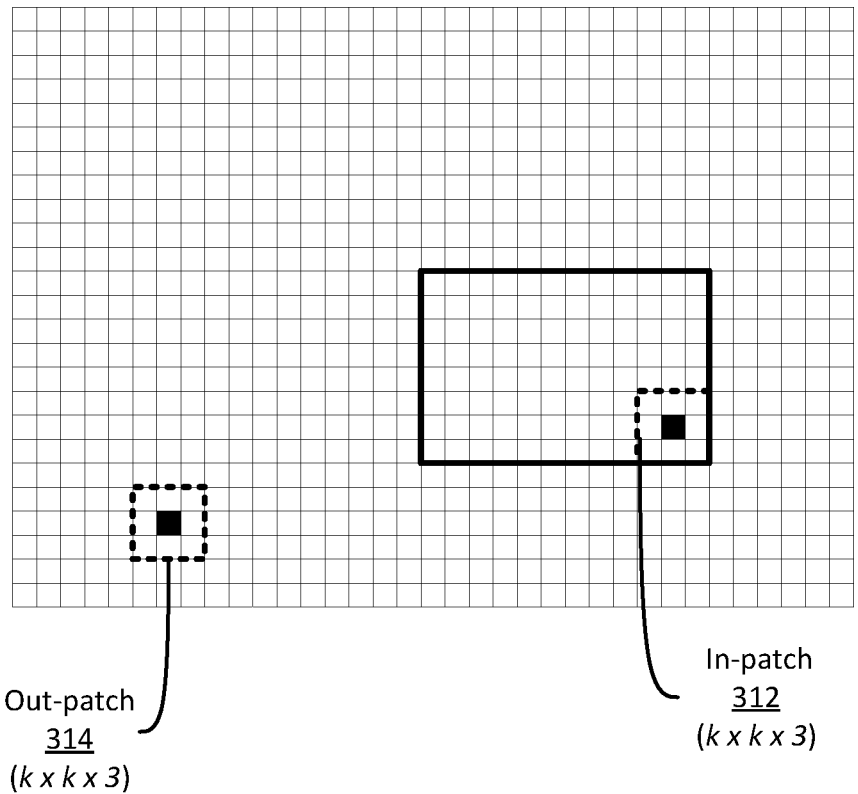
FIG. 3 illustrates examples of patches in an image, according to embodiments of the present disclosure.

FIG. 3 illustrates examples of patches in an image, according to embodiments of the present disclosure. The image here refers to the image 210 of FIG. 2, having the region of interest 212. In the interest of clarity of explanation, an in-pixel and out-pixel are shown in FIG. 3 with solid black boxes. However, this indication is only to refer to the two pixels and do not represent any visual properties of these pixels. The in-pixel has a patch centered around it. This patch is referred to herein as an in-patch 312 to indicate that it is centered around an in-pixel (it can also be referred to as a destination patch or a patch in a destination region). On the other hand, the out-pixel has a different patch centered around it. This patch is referred to herein as an out-patch 314 to indicate it is centered around an out-pixel (it can also be referred to as a source patch or a patch in a source region). The in-patch 312 and out-patch have the same dimensions of K×K×3. The the first "K" dimension refers to the height of the patch, the second "K" dimension refers to the width of the patch (in this example, a square patch), and the third "3" dimension refers to the three RGB values of the K×K pixels contained in the patch.

However, the two patches could have different dimensions, and the patches need not be squares. In the illustrative example of FIG. 3, K=3 and, hence, each patch contains a total of nine pixels. In another example, "K" is equal to seven.

Figure 4:
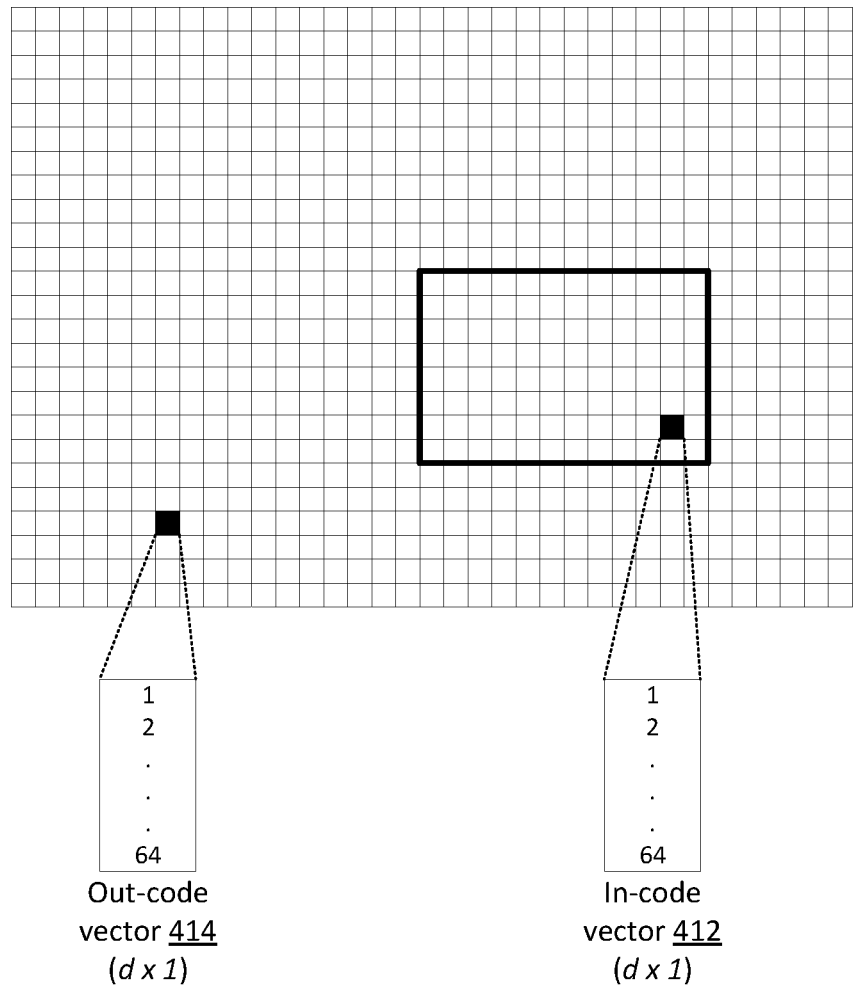
FIG. 4 illustrates examples of code vectors associated with pixels of an image, according to embodiments of the present disclosure.

FIG. 4 illustrates examples of code vectors associated with pixels of an image, according to embodiments of the present disclosure. The image here refers to the image 210 of FIG. 2, having the region of interest 212. FIG. 4 shows two code vectors. A first code vector is associated with an in-pixel and is referred to herein as an in-code vector 412. A second code vector is associated with an out-pixel and is referred to herein as an out-code vector 414. Each of the code vectors is generated by a neural network (e.g., the patch descriptor 122 of FIG. 1) and describes features learned by the neural network for a patch. For instance, the in-code vector 412 is associated with the in-pixel 214 which has an in-patch 312 centered around it. Accordingly, the in-code vector 412 contains features descriptive of the in-patch 312. Similarly, the out-code vector 414 is associated with the out-pixel 216 which has an out-patch 314 centered around it. Accordingly, the out-code vector 414 contains features descriptive of the out-patch 314. Each of the two code vectors is a d×1 code vector, where "d" refers to the number of features learned by the neural network for the corresponding patch and "1" refers to the fact that this is a one dimensional vector with the "d" features. In an example, "d" is equal to sixty-four.

Figure 5:
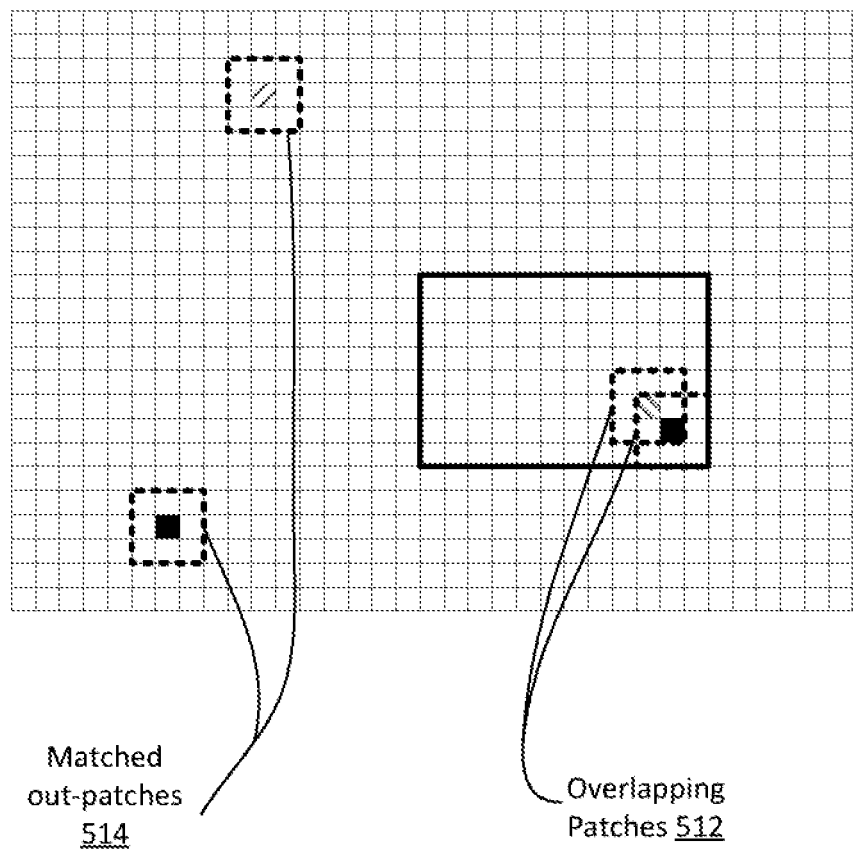
FIG. 5 illustrates examples of overlapping patches and matched patches within an image, according to embodiments of the present disclosure.

FIG. 5 illustrates examples of overlapping patches and matched patches within an image, according to embodiments of the present disclosure. Here also, the image refers to the image 210 of FIG. 2, having the region of interest 212. As illustrated, an in-pixel is contained in multiple overlapping patches 512. One of these patches 512 is centered around the in-pixel, while remaining ones are centered around other in-pixels. Two patches are overlapping when they contain at least one common pixel. For K×K×3 patches, an in-pixel may be contained in a total of K×K overlapping patches (e.g., nine overlapping patches for K=3 as illustrated in FIG. 5, or forty-nine overlapping patches for K=7).

Each in-pixel has an in-code vector that is matched (e.g., by the code vector matcher 124 of FIG. 1) with an out-code vector of an out-pixel. That out-pixel has an out-patch centered around it. Hence, this in-pixel can be thought as being matched with that out-patch. Further, the in-pixel is also contained in overlapping patches (e.g., for a total of K×K overlapping patches), each of which is centered around another in-pixel matched with another out-pixel being the center of another out-patch. Accordingly, this same in-pixel can also be though as being matched with these other out-patches associated with the remaining overlapping patches. The total set of matched out-patches is referred to as matched out-patches 514 and these matched out-patches 514 need not overlap.

As illustrated in FIG. 5, the in-pixel 214 becomes associated with the matched out-patch of the out-pixel 216 and with another matched out-patch of another out-pixel. The match between the in-code vector 412 of the in-pixel 214 with the out-code vector 414 of the out-pixel 216 results in the first association of the in-pixel 214 with the matched out-patch of the out-pixel 216. The code vector match between the other in-pixel (shown with a dashed line) of an overlapping patch with another out-pixel (also shown with a dashed line) results in the second association of the in-pixel 214 with the matched out-patch of the other out-pixel.

Figure 6:
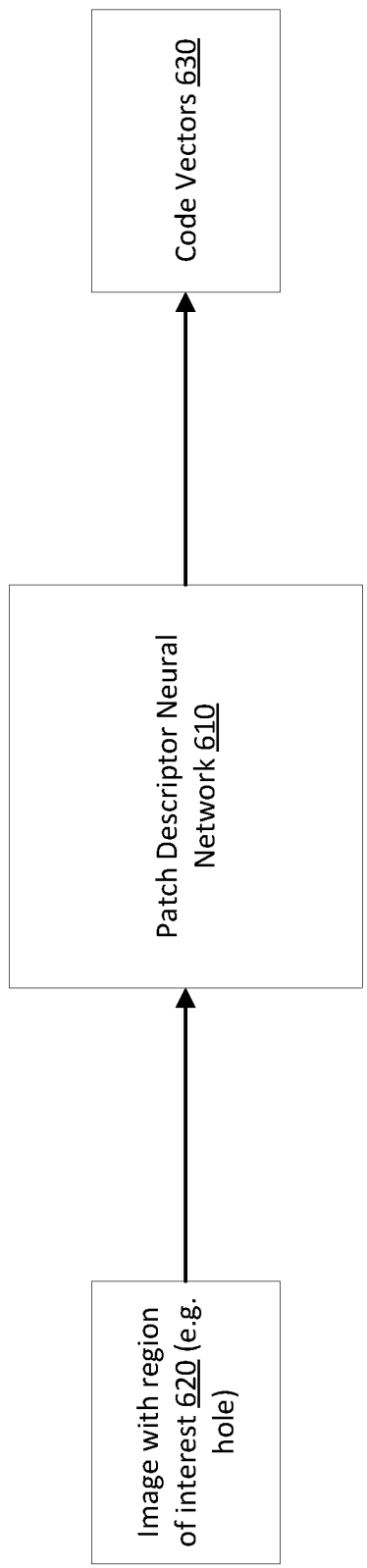
FIG. 6 illustrates an example of a neural network trained to generate code vectors, according to embodiments of the present disclosure.

FIG. 6 illustrates an example of a neural network trained to generate code vectors, according to embodiments of the present disclosure. As illustrated, the neural network is a patch descriptor neural network 610 that, upon training, receives an image 620 having a region of interest (e.g., a hole) and outputs code vectors 630 from the image 620. In particular, the patch descriptor neural network 610 generates a patch for each pixel in the image 620, where the patch is centered around the pixel. The patch descriptor neural network 610 is trained to learn features of the patches and to generate a code vector that describes each of the patches. Each code vector is associated with a pixel and describes the features of the patch that is centered around that pixel. In this way, any in-pixel inside the region of interest is associated with a code vector that describes the in-patch of that in-pixel. The features in the code vector are learned by the patch descriptor neural network 610 based on information available from the image 620.

Patch-based image inpainting can be formulated as an iterative optimization with alternating search and vote steps. In the search step, for each overlapping patch inside the region of interest, the goal is to find a known similar patch with respect to some distance function. Traditional patch-based inpainting methods perform search in the space of RGB patches, using mean square error (MSE) as the distance measure. However, this RGB similarity measure may not be reliable, especially in the initial hole-filling iterations, while the hole contains smooth interpolated colors resulting from a heuristic initialization (e.g. boundary interpolation), and low-resolution initial solutions.

That is, in RGB patch-space, the similar patches for intermediate smooth content inside the region of interest are not the same as similar patches of the final sharp content. In contrast, the patch descriptor neural network 610 is implemented to learn a feature space in which the distance between feature vectors inside the region of interest and features outside the hole approximates the distance between the final content inside the region of interest after inpainting and the content outside the region of interest. In other words, these descriptors contain semantic and structural information that does not yet exist, or exists only in the low frequency information. In a way, this network 610 learns these "future-looking" descriptors conditioned on ground-truth image content and current region of interest state by training on a large dataset.

In an example, the patch descriptor neural network 610 is a fully convolutional neural network (CNN) that is deployed as an encoding function. The CNN has a stride of four implemented by using two convolutional layers with a stride of two. Dilated convolutions are used to increase the final receptive field of the network. Given an image with size w×H, the CNN outputs a W×H×D code vector map, rather than RGB values for each pixel.

The loss function of the CNN is described herein next. In an example, $I=\{I_1, \ldots, I_N\}$ represents the set of training images. $\mathcal{H}^n = \{p_{ij}\}_{j=1}^{|\mathcal{H}^n|}$ denotes the set of K×K patches centered at each pixel inside the hole of image $I^n$ (e.g., K=7), and $\overline{\mathcal{H}}^n = \{q_{ik}\}_{k=1}^{|\overline{\mathcal{H}}^n|}$ denotes the set of a plurality of overlapping patches with no unknown pixels. $\mathcal{H}^n \cup \overline{\mathcal{H}}^n$ is the set of a plurality of patches in image $I^n$.

Let $g_{ij}$ represent the ground-truth patch content for $p_{ij} \in \mathcal{H}^n$ $f_e(\bullet)$ is an encoder function, parameterized by e which conditioned on an image generates a d-dimensional code vector for a plurality of patches in $\mathcal{H}^n \cup \overline{\mathcal{H}}^n$ (e.g., d=64). The CNN represents $f_e(\bullet)$ and its parameters are solved by training on a large scale image dataset. The goal is to learn an encoding function such that the similarity for a plurality of patches in the hole to a plurality of patches outside the hole, is equal to the similarity between the known ground-truth content in the hole, to the same patches outside the hole. To learn such an encoding, the function $f_e(\bullet)$ is conditioned on the entire image. At test time, given an image, the CNN generates code vectors for a plurality of overlapping patches in a single forward pass.

Accordingly, the loss of the CNN is defined as $$\operatorname*{argmin} \frac{1}{N'} \sum_{i=1} \sum_{p_{ij} \in \mathcal{H}^n} \sum_{q_{ij} \in \overline{\mathcal{H}}^n} \|S(f_\theta(p_{ij} \mid I^n), f_\theta(q_{ik} \mid I^n)) - S(g_{ij}, q_{ik})\|_2^2.$$

$S(.,.)$ is a given similarity measure (e.g., cosine similarity) and $N' = N \times \Sigma_i |\mathcal{H}^n| \times |\overline{\mathcal{H}}^n|$.

Given the large number of overlapping patch pairs and the computation of pairwise similarities between a plurality of these patches, the computational burden becomes large even for a plurality of mini-batches. To reduce this burden, a stochastic approach is adopted in the training. In an example of this approach, for each training image, the CNN uniformly or randomly samples from patches inside and outside the hole to form training pairs on the fly, and replace the sum over a plurality of patches in the loss function with one over the random sample set.

During training, a stochastic Adam optimizer is used to update the parameters of the CNN. For each image in the mini-batch, a fixed number of patch pairs is uniformly sampled inside and outside the region of interest without replacement to estimate the loss function. The similarities are computed based on the current generated code vectors on the fly and the loss is back propagated only for the selected patches. During sampling from patches outside the region of interest, patches which lie on the image boundary or have any unknown pixels are rejected.

Figure 7:
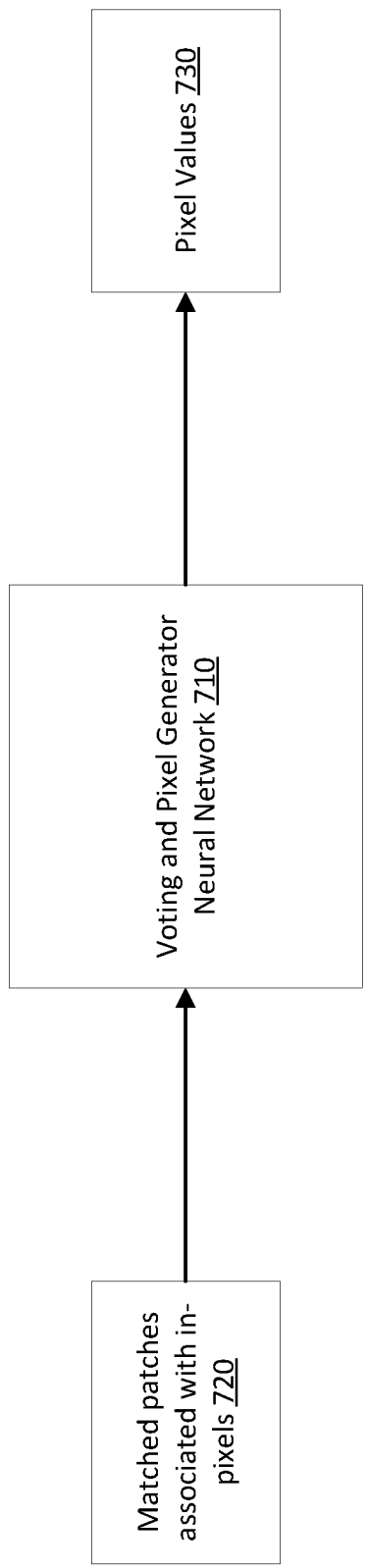
FIG. 7 illustrates an example of a neural network trained to generate pixel values for pixels inside a region of interest of an image, according to embodiments of the present disclosure.

FIG. 7 illustrates an example of a neural network trained to generate pixel values for pixels inside a region of interest of an image, according to embodiments of the present disclosure. As illustrated, the neural network is a voting and pixel generator neural network 710 that, upon training, receives matched patches 720 associated with in-pixels and outputs code pixel values 730 for the in-pixels. In particular, the voting and pixel generator neural network 710 generate the pixel value for each in-pixel based on a weighted combination of content of the matched patches associated with that in-pixel. As explained herein above, the in-pixel is contained in multiple overlapping in-patches, each of which is centered around an in-pixel. Code vectors for these overlapping patches are matched with code vectors corresponding to out-patches. Accordingly, the in-pixel is associated with these matched out-patches. For that in-pixel, the input to the voting and pixel generator neural network 710 is the matched out-patches. The network 710 is trained to weigh their content and derive the pixel value for the in-pixel. This process is referred to herein as a voting process.

In an example, once the in-pixels have been matched with out-pixels based on code vectors (e.g., by at least using the neural network of FIG. 6), each in-patch (e.g., patches inside the hole) is assigned to a similar out-patch (e.g. patches outside the hole). As the in-patches are overlapping, each in-pixel in the region of interest is mapped into multiple locations in outside the region of interest. Voting is the process of aggregating information from a plurality of the matched out-patches to assign a color value to each in-pixel. For an in-pixel at position "x" in the region of interest, let "$N_x$" be the set of a plurality of pixel positions in the source domain which are mapped into "x." The voting step can be formulated as follows:

$$C(x) = \frac{\sum_{y \in N_x} w_y C(y)}{\sum_{y \in N_x} W_y},$$

where $C(\cdot)$ denotes the color values at a given spatial position and "$W_y$" is the contribution weight of the out-pixel at location "y." Traditionally, the weights for a plurality of source pixels are set to one forming a uniform voting scheme. However, uniform voting leads to undesirable blurring effects as the averaging does not take the image structure into account. Instead, position sensitive weights are used for combining the information of the matched out-patches effectively.

In an example, the voting and pixel generator neural network 710 is a convolutional neural network (CNN) with a similar structure to the one described in connection with FIG. 6. Its loss function is described herein next. $I = \{I_1, \ldots, I_N\}$ represents the set of target training images. Using K×K patches, for each image $I_i$ with width $W_i$ and height $H_i$, $V_i \in \mathbb{R}^{W_i \times H_i \times K^2 \times 3}$ is defined as the matrix containing a plurality of out-pixels assigned to each of its in-pixels (e.g., the (j, k, l)'th channel represents the RGB color values of the l'th mapped out-pixel to in-pixel (j, k)). For simplicity, the $V_i^l \in \mathbb{R}^{W_i \times H_i \times 3}$ is used to represent the image formed by copying contents from the l'th mapped out-patches to each of the in-pixels. The loss function for learning a voting function $f_\theta^V(V_i): \mathbb{R}^{W_i \times H_i \times K^2 \times 3} \to \mathbb{R}^{W_i \times H_i \times K^2}$ parameterized by e can be formulated as:

$$\frac{1}{N} \sum_{i=1}^{N} \left\| \sum_{l=1}^{K^2} (V_i^l \odot rep(W_i^l)) - I_i \right\|_F^2$$

s.t. $\forall i W_i = f_\theta^R(V_i)$ and $\sum_l W_i^l = 1$.

$W_i^l \in \mathbb{R}^{W_i \times H_i}$ is the l'th channel of $W_i$, $rep(\cdot)$ is a function repeating the weights along the color dimension, 1 is the one matrix, and $\odot$ denotes the element-wise matrix multiplication.

To further improve the voting quality, residual function $f_\theta^R: \mathbb{R}^{W_i \times H_i \times K^2 \times 3} \to \mathbb{R}^{W_i \times H_i \times 3}$ is introduced. Given the information of the mapped out-pixels, $f_\theta^R$ outputs a residual image to predict and add the possible missing information in the source domain to the final output. The final loss function is as follows:

$$\frac{1}{N} \sum_{i=1}^{N} \left\| \sum_{l=1}^{K^2} (V_i^l \odot rep(W_i^l)) - f_\theta^R(V_i) - I_i \right\|_F^2$$

s.t. $\forall i W_i = f_\theta^R(V_i)$ and $\sum_l W_i^l = 1$.

Adding the residual image improves the quality of the final output noticeably. In an example, a unified convolutional neural network to represent both $f_\theta^V$ and $f_\theta^R$. The backbone of the voting network is similar to the CNN described in connection with FIG. 6. The voting function $ff_\theta^V$ and the residual function $f_\theta^R$ are implemented in a single fully convolutional neural network. They share the first convolutional layers. However, the network has two output branches to estimate these functions. The voting branch outputs $K^2$ channels with the same spatial size as the input image. Each spatial position in the output is normalized by dividing it by the sum of the channels in that position. The normalized output is repeated along the color dimension. After an element-wise multiplication with the input, a summation is performed along the $K^2$ channels to form the voting result. The residual branch directly predicts three RGB residual channels. These predicted channels are added to the voting result to form the final three channel target image.

To train the model, a dataset of frame pairs is created from training videos. From each video in the training videos, (source, destination) frame pairs are collected with {5; 10; 15; 20; 30} temporal difference. The approximate nearest neighbor in the source frame is found for each 7×7 patch in the destination frame using the Patch-Match algorithm. These nearest neighbors are used to train the network 710 to reconstruct the destination frame from the source frame. The network 710 is trained end-to-end with stochastic Adam optimizer.

FIGS. 8-12 illustrate examples of flows for using a neural network for patch-based inpainting. A computer system hosting the neural network, such as the computer system of FIG. 1, may be configured to perform the illustrative flows in some embodiments. Instructions for performing the operations of the illustrative flows can be stored as computer-readable instructions on a non-transitory computer-readable medium of the computer system. As stored, the instructions represent programmable modules that include code or data executable by a processor(s) of the computer system. The execution of such instructions configures the computer system to perform the specific operations shown in the figures and described herein. Each programmable module in combination with the processor represents a means for performing a respective operation(s). While the operations are illustrated in a particular order, it should be understood that no particular order is necessary and that one or more operations may be omitted, skipped, and/or reordered. Further, some of the operations are similar between the flows. In the interest of brevity, the similarities are not repeated. The example flows can be performed on the same computer system, distributed across multiple computer systems, performed together, and/or performed independently of each other.

Figure 8:
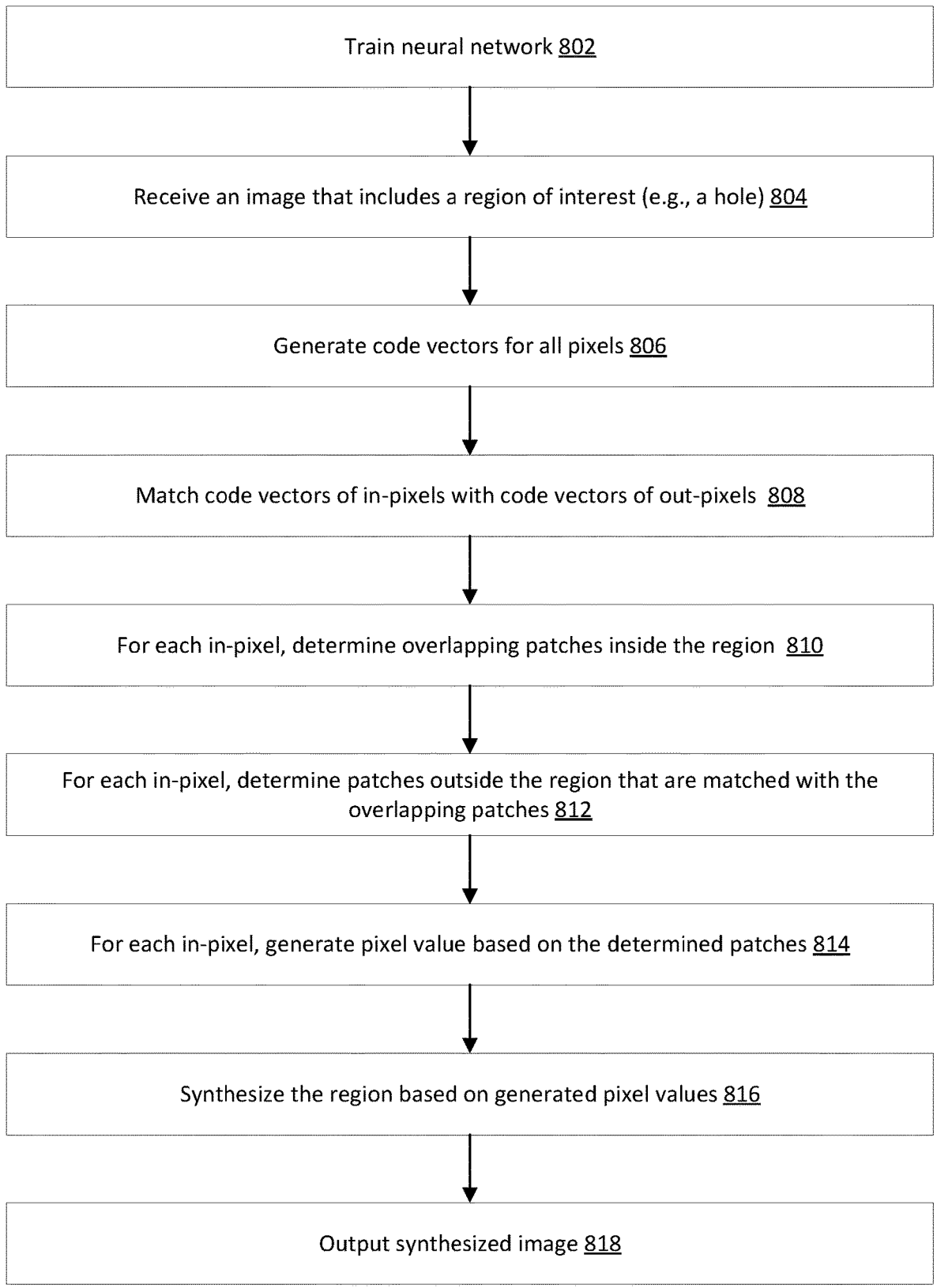
FIG. 8 illustrates an example of an end-to-end flow for using a neural network for patch-based inpainting, according to certain embodiments of the present disclosure.

FIG. 8 illustrates an example of an end-to-end flow for using a neural network for patch-based inpainting, according to certain embodiments of the present disclosure. The example flow starts at operation 802, where the computer system trains the neural network. In an example, the neural network includes two sub-networks: a patch descriptor neural network and a voting and pixel generator neural network. Each of these sub-networks may be trained separately. Example training operations are further described in connection with FIGS. 10 and 12.

At operation 804, the computer system receives an image that includes a region of interest, such as a hole. In an example, the image is received from a user device (e.g., from a content editing application hosted on the user device) with a request to fill the region with content based on known content in remaining portions of the image.

At operation 806, the computer system generates code vectors for all pixels. In an example, the computer system generates a patch centered around each of the pixels in the image. By using the neural network (e.g., by inputting the image to the neural network), the computer system receives, from the neural network, the code vectors corresponding to these patches.

At operation 808, the computer system matches code-vectors of in-pixels with code vectors of out-pixels. In an example, the matching uses a similarity measures. For instance, two code vectors are matched based on cosine similarity or Euclidean distance between them. Various matching techniques are possible. One technique implements a brute force approach, where a code vector of an in-pixel is compared to each code vector of the out-pixels to find the best match. Another technique optimizes the search by using, for instance, a nearest neighbor or approximate nearest neighbor search.

At operation 810, the computer system determines, for each in-pixel, the overlapping patches inside the region of interest. In an example, the each patch has K×K dimensions (e.g., in term of height and width). Hence, each in-pixel will be at the center of one patch and will be contained in K×K−1 remaining patches. The computer system identifies, for each in-pixel, the corresponding overlapping patches and the location of the in-pixel in these patches (e.g., center, top right corner, etc.).

At operation 812, the computer system determines, for each in-pixel, patches outside the region of interest that are matches with the overlapping patches. In an example, each overlapping patch from a set associated with a particular in-pixel is centered around either this in-pixel or another one. Hence, this set of K×K overlapping pixels covers K×K in-pixels including the particular one. Each of these in-pixels has a code vector matched with an out-pixel that, in turn, has an out-patch centered around it. Accordingly, the particular in-pixel is associated with the our-patches of these matched out-pixels. This set of the matched out-patches is the set of patches that the computer system determines to be associated with the particular in-pixel and that the computer will use in deriving the pixel value of the particular in-pixel.

At operation 814, the computer system generates, for each in-pixel, a pixel value based on the out-patches determined for that in-pixel at operation 812. In an example, each matched out-pixel is associated with one of the overlapping patches that contains the in-pixel at a particular location. Accordingly, each matched out-pixel is also associated with that particular location of the in-pixel in the associated overlapping patch. For each in-pixel, the computer system inputs, to the neural network, the matched out-patches and associated locations of the in-pixel in the relevant overlapping patches. In response, the neural network outputs a weighted combination of pixel values from the matched out-patches, where the weight depends on the associated location of the in-pixel. The weighted combination gives the pixel value for the in-pixel.

At operation 816, the computer system synthesizes the region of interest based on the generated pixel values for the different in-pixels. In an example, the computer system fills out the region by assigning each generated pixel value to the corresponding in-pixel.

At operation 818, the computer system outputs the synthesized image. For example, the computer system responds to the user device (or the content editing application) by sending the synthesized image thereto.

Figure 9:
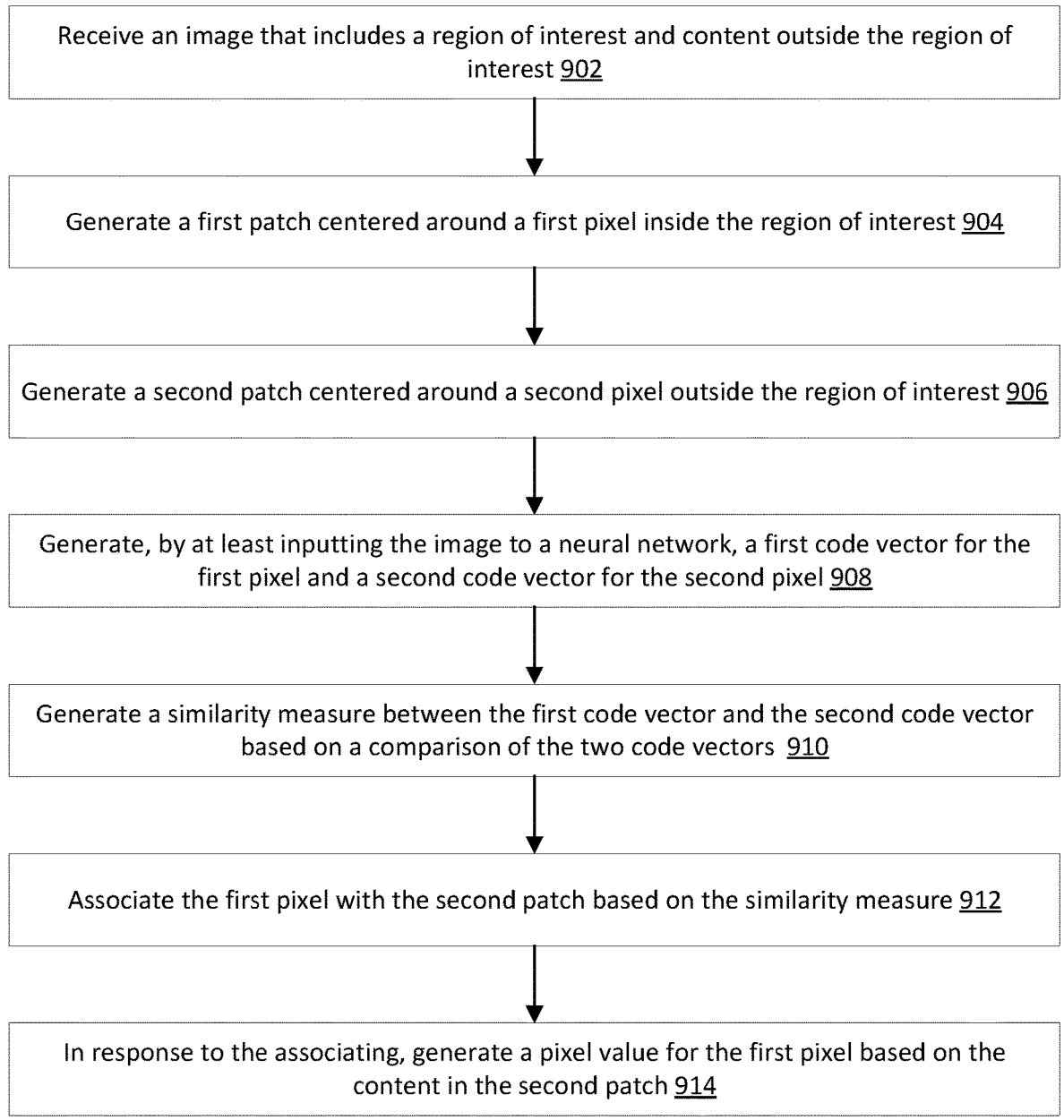
FIG. 9 illustrates an example of a flow for generating code vectors by a neural network, according to certain embodiments of the present disclosure.

FIG. 9 illustrates an example of a flow for generating code vectors by a neural network, according to certain embodiments of the present disclosure. In the interest of clarity of explanation, the flow is described in connection with a single in-pixel. However, the operations of the flow can be similarly performed for all in-pixels. The example flow starts at operation 902, where the computer system receives an image that includes a region of interest (e.g., a hole that is missing content) and content outside the region of interest.

At operation 904, the computer system generates a first patch centered around a first pixel inside the region of interest (e.g., an in-pixel). In an example, the patch has pre-defined dimensions (e.g., a K×K square), includes the in-pixel at its center, and includes other pixels.

At operation 906, the computer system generates a second patch centered around a second pixel outside the region of interest (e.g., an out-pixel). In an example, the patch has the same pre-defined dimensions (e.g., a K×K square), includes the out-pixel at its center, and includes other pixels.

At operation 908, the computer system generates, by at least inputting the image to the neural network, a first code vector for the first pixel and a second code vector for the second pixel. The first code vector includes features that are learned by the neural network and that are descriptive of the first patch. Similarly, the second code vector includes features that are learned by the neural network and that are descriptive of the second patch. In an example, the computer system inputs the image to the neural network and receives back code vectors and their associations with the pixels (e.g., some indicators that identify a code vector and the pixel with which it is associated).

At operation 910, the computer system generates a similarity measure between the first code vector and the second code vector based on a comparison of the two code vectors. In an example, the computer system uses cosine similarity or Euclidean distance to compare the two code vectors.

At operation 912, the computer system associates the first pixel with the second patch based on the similarity measure. For example, when the two code vectors are similar enough or are the best patch, the computer system performs this association. In particular, a brute force search or a nearest neighbor search can be performed to compare the first code vector of the first pixel (e.g., the in-pixel) with code vectors of various out-pixels, including the second code vector. When the second code vector best matches the first code vector, the computer system associates the first code vector with the second code vector and, in turn, associates the first pixel with the second patch that corresponds to the second code vector. Associating the first pixel with the second patch can include adding an indicator that the first pixel was matched to the second patch (e.g., a key-value pair, where the key is the first pixel and the value is the second patch).

At operation 914, the computer system, in response to the associating, generates a pixel value for the first pixel based on the content in the second patch. In an example, the computer system uses a voting and pixel generator neural network to generate the pixel value as described herein above and as further described in connection with the flow of FIG. 11. In another example, an averaging could be used. In particular, the computer system determines an overlapping patch that includes the first pixel. The overlapping patch is centered around a third pixel inside the region of interest and overlaps with the first patch. The first pixel has a particular location in that overlapping patch (e.g., a top left corner). The third pixel is associated with a fourth patch centered around a fourth pixel outside the region of interest (e.g., by performing the above operations for all the in-pixels). Accordingly, the pixel value for the first pixel is generated by at least averaging pixel values from the content in the second patch and the fourth patch (and, similarly any other matched out-patches given the overlapping patches that contain the first pixel). The averaging can account for the location of the first pixel in the overlapping patches. For instance, the first pixel has a center position in the first patch. Accordingly, the RGB value of the center pixel in the second patch is set as a first value. Similarly, the first pixel is at the top left corner in the overlapping patch. Accordingly, the RGB value of the top left corner pixel in the fourth patch as a second value. The pixel value of the first pixel is then the average of the first value and second value.

Figure 10:
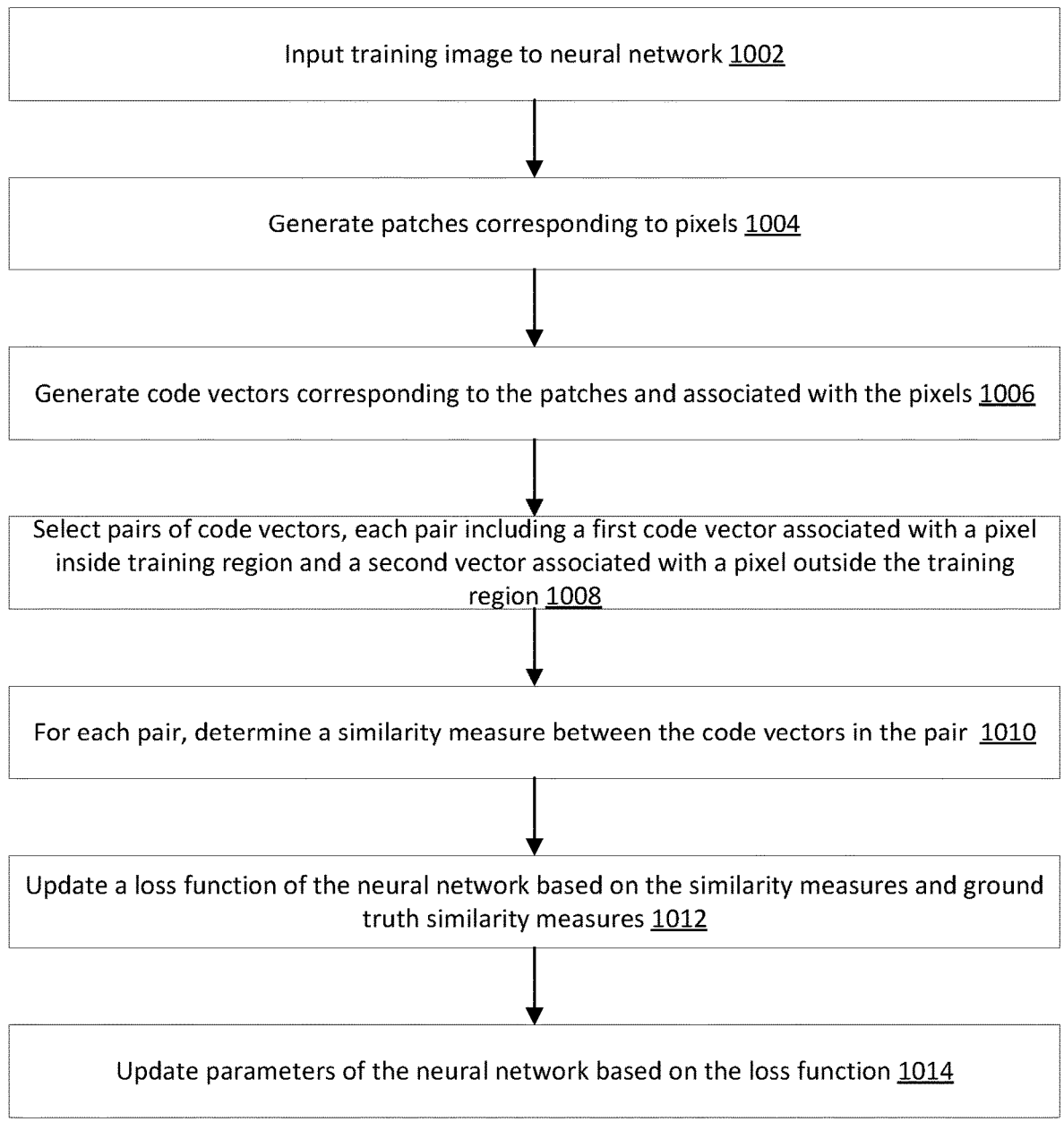
FIG. 10 illustrates an example of a flow for training a neural network to generate code vectors, according to certain embodiments of the present disclosure.

FIG. 10 illustrates an example of a flow for training a neural network to generate code vectors, according to certain embodiments of the present disclosure. This flow can be used to train the neural network used in support of the example flow of FIG. 9. In the interest of clarity of explanation, the example flow is described in connection with a single training image. However, the operations of this flow are similarly performed across multiple training images.

As illustrated, the example flow of FIG. 10 starts at operation 1002, where the computer system inputs a training image to the neural network. The training image includes a known region of interest (e.g., a hole that was generated by removing known content from the training image, referred to herein as a training region). The training image can be associated with a training label that includes the known region of interest (e.g., the removed content). This training label can also be input to the neural network.

At operation 1004, the computer system generates patches corresponding to pixels of the training image. In an example, the neural network generates the patches, each having predefined dimensions.

At operation 1006, the neural network generates code vectors corresponding to the patches and associated with the pixels. For example, the training image and various patches are processed through the layers of the neural network that learns various features. The neural network generates the code vectors, where each code vector is a feature map that includes features learned for a corresponding patch.

At operation 1008, the neural network selects pairs of code vectors. Each pair includes code vector associated with a pixel inside the training region and another code vector associated with another pixel outside the training region. In an example, the selection is random or amounts to a uniform sampling of the pixels, which reduces the computational burden of the training.

At operation 1010, the computer system determines, for each pair, a similarity measure between the code vectors in the pair. For example, the computer system (or the neural network) compares the two code vectors in the pair to compute a cosine similarity or a Euclidean distance.

At operation 1012, the computer system updates, given each pair, a loss function of the first neural network based on a comparison of the similarity measure between the code vectors in the pair and a ground truth similarity measure between the code vectors in the pair. In particular, because the region of interest is a known region and its content is known and is available from the training label, the computer system (or the neural network) can also compute the ground truth similarity measure for each pair of code vectors. In particular, these code vectors can be generated from the known content and, thus, represent ground truth code vectors. When compared by using cosine similarity or a Euclidean distance, the resulting similarity is a ground truth similarity measure. For a pair, the difference between its ground truth similarity measure and the similarity measure derived at operation 1010 represents a loss. The loss is used to update the loss function of the neural network.

At operation 1014, the computer system updates parameters of the neural network based on the loss function. For example, weights of the connections between the nodes of the neural network and other parameters are fine-tuned through stochastic gradient descent back propagation based on the loss function.

Figure 11:
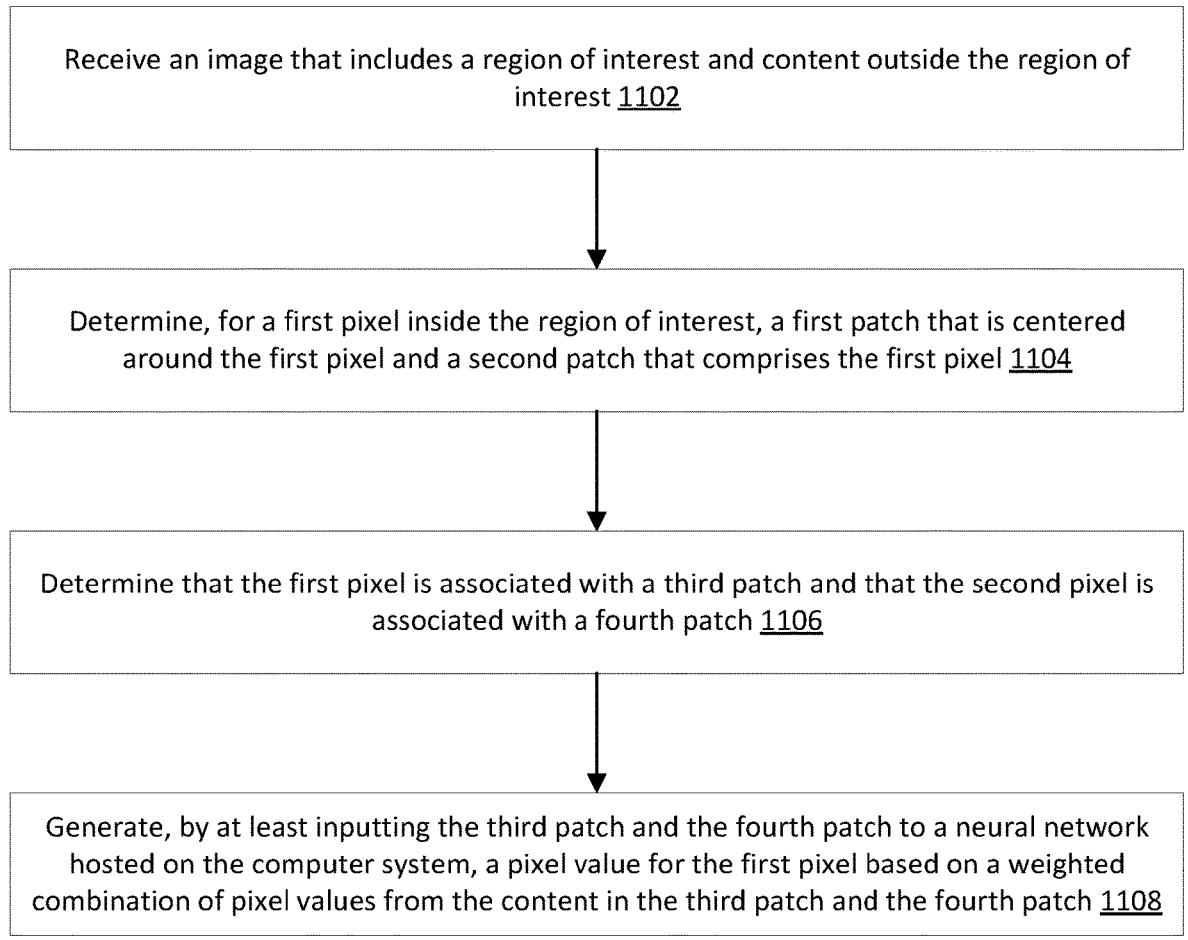
FIG. 11 illustrates an example of a flow for generating pixel values by a neural network, according to certain embodiments of the present disclosure.

FIG. 11 illustrates an example of a flow for generating pixel values by a neural network, according to certain embodiments of the present disclosure. In the interest of clarity of explanation, the flow is described in connection with a single in-pixel. However, the operations of the flow can be similarly performed for all in-pixels. The example flow starts at operation 1102, where the computer system receives an image that includes a region of interest (e.g., a hole that is missing content) and content outside the region of interest.

At operation 1104, the computer system determines, for a first pixel inside the region of interest, a first patch that is centered around the first pixel and a second patch that comprises the first pixel. The second patch is centered around a second pixel inside the region of interest and overlaps with the first patch. Accordingly, the first pixel has a center location in the first patch and another location (e.g., top left corner) in the second patch. This operation may be repeated to identify all overlapping patches that contain the first pixel and to identify the location of the first pixel in each of these patches.

At operation 1106, the computer system determines that the first pixel is associated with a third patch and that the second pixel is associated with a fourth patch. The third patch is centered around a third pixel outside the region of interest (e.g., is an out-patch). Similarly, The fourth patch is centered around a fourth pixel outside the region of interest (e.g., is also an out-patch). In an example, the first pixel, second pixel, third pixel, and fourth pixel are associated with a first code vector, second code vector, third code vector, and fourth code vector respectively. Determining that the first pixel is associated with the third patch is based on the first code vector and the third code vector being best matched vectors according to a similarity measure (e.g., a cosine similarity). Also, determining that the second pixel is associated with the fourth patch is based on the second code vector and the fourth code vector being best matched vectors according to the similarity measure. In addition, at this operation, the locations of the first pixel in the first patch (e.g., center) and the second patch (e.g., top left corner) are also associated with the third patch and fourth patch respectively. For instance, the first pixel is associated with the center location in the third patch and with the top left corner in the fourth patch given how the code vectors were matched.

At operation 1108, the computer system generates, by at least inputting the third patch and the fourth patch to the neural network, a pixel value for the first pixel based on a weighted combination of pixel values from the content in the third patch and the fourth patch. The weighted combination is learned by the neural network. In an example, the associated locations of the first pixel with the third and fourth patches are derived by the neural network or input thereto. The weighted combination accounts for these locations (e.g., the weight for the center location can be larger than that of the top left corner, depending on how the neural network learns to set the weights during its training). For instance, the pixel value of the center pixel in the third patch is allocated one weight, and the pixel value of the top left corner in the fourth patch is allocated another weight, and the combination of these two weighted pixel values contributes to the pixel value of the first pixel.

Figure 12:
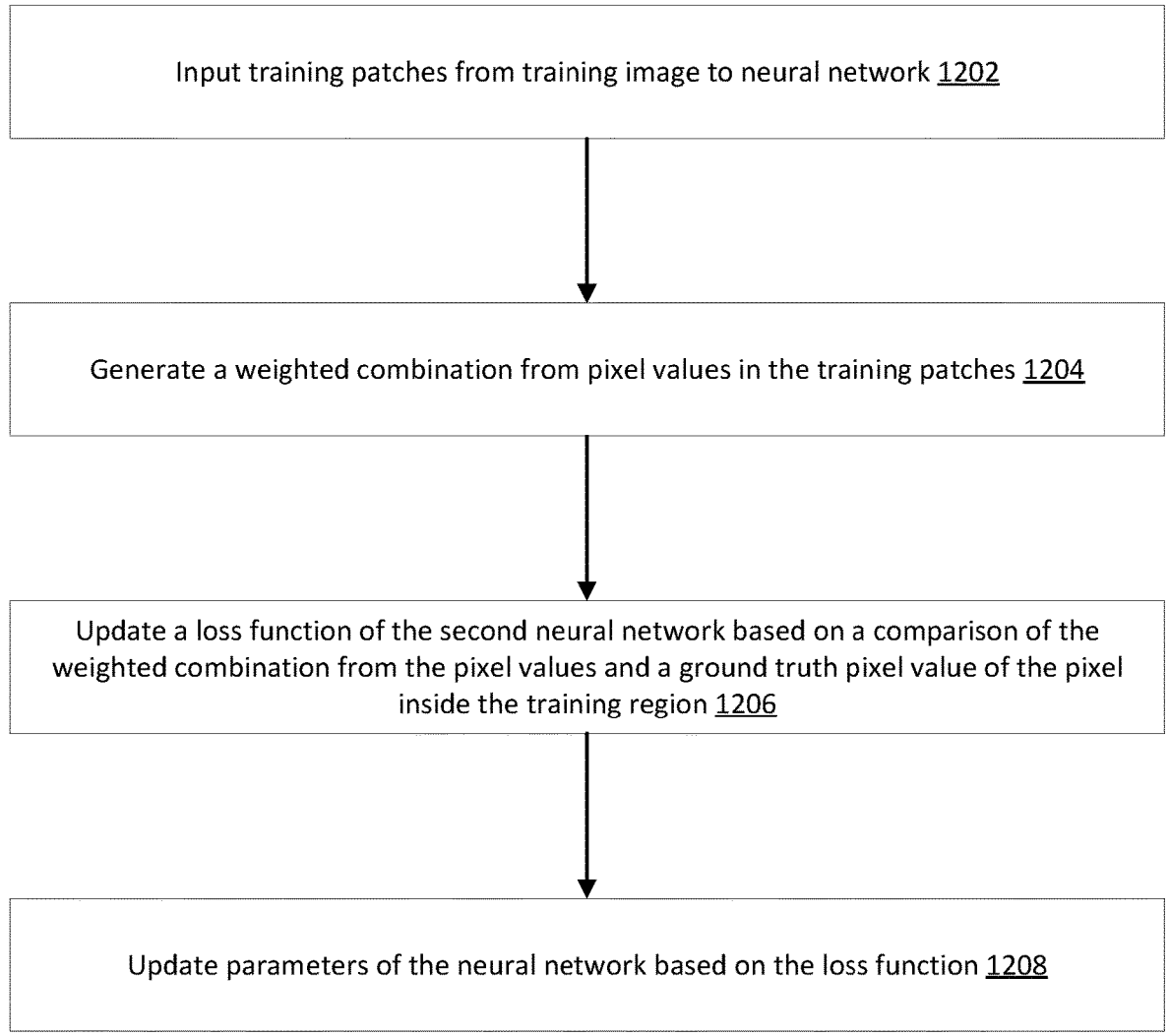
FIG. 12 illustrates an example of a flow for training a neural network to generate pixel values, according to certain embodiments of the present disclosure.

FIG. 12 illustrates an example of a flow for training a neural network to generate pixel values, according to certain embodiments of the present disclosure. In the interest of clarity of explanation, the example flow is described in connection with a single training image. However, the operations of this flow are similarly performed across multiple training images.

The example flow starts at operation 1202, where the computer system inputs training patches from a training image to the neural network. The training image includes a training region of interest. The training patches are located outside the training region of interest (e.g., out-patches) and are associated with a pixel inside the training region of interest (e.g., an in-pixel). In an example, the training patches are labeled, where the label identifies the pixel and locations of the pixel associated with the training patches. Of course, similar groupings of patches can exist for other in-pixels and are used in the training.

At operation 1204, the neural network generates a weighted combination from pixel values in the training patches. For example, each training patch is associated with a location of the pixel. The RGB value at each associated location within each training patch is multiplied by a weight. The weights are learned by the neural network during the training.

At operation 1206, the computer system updates a loss function of the neural network based on a comparison of the weighted combination from the pixel values and a ground truth pixel value of the pixel inside the training region. In an example, the weighted combination derived at operation 1204 represents a predicted pixel value for the pixel. Nonetheless, the actual pixel value of this pixel is known in the training (e.g., can be available from a training label). This known pixel value is the ground truth pixel value. For the pixel, the difference between its ground truth pixel value and the pixel value derived at operation 1204 represents a loss. The loss is used to update the loss function of the neural network.

At operation 1208, the computer system updates parameters of the neural network based on the loss function. For example, the parameters are fine-tuned through stochastic gradient descent back propagation based on the loss function.

Figure 13:
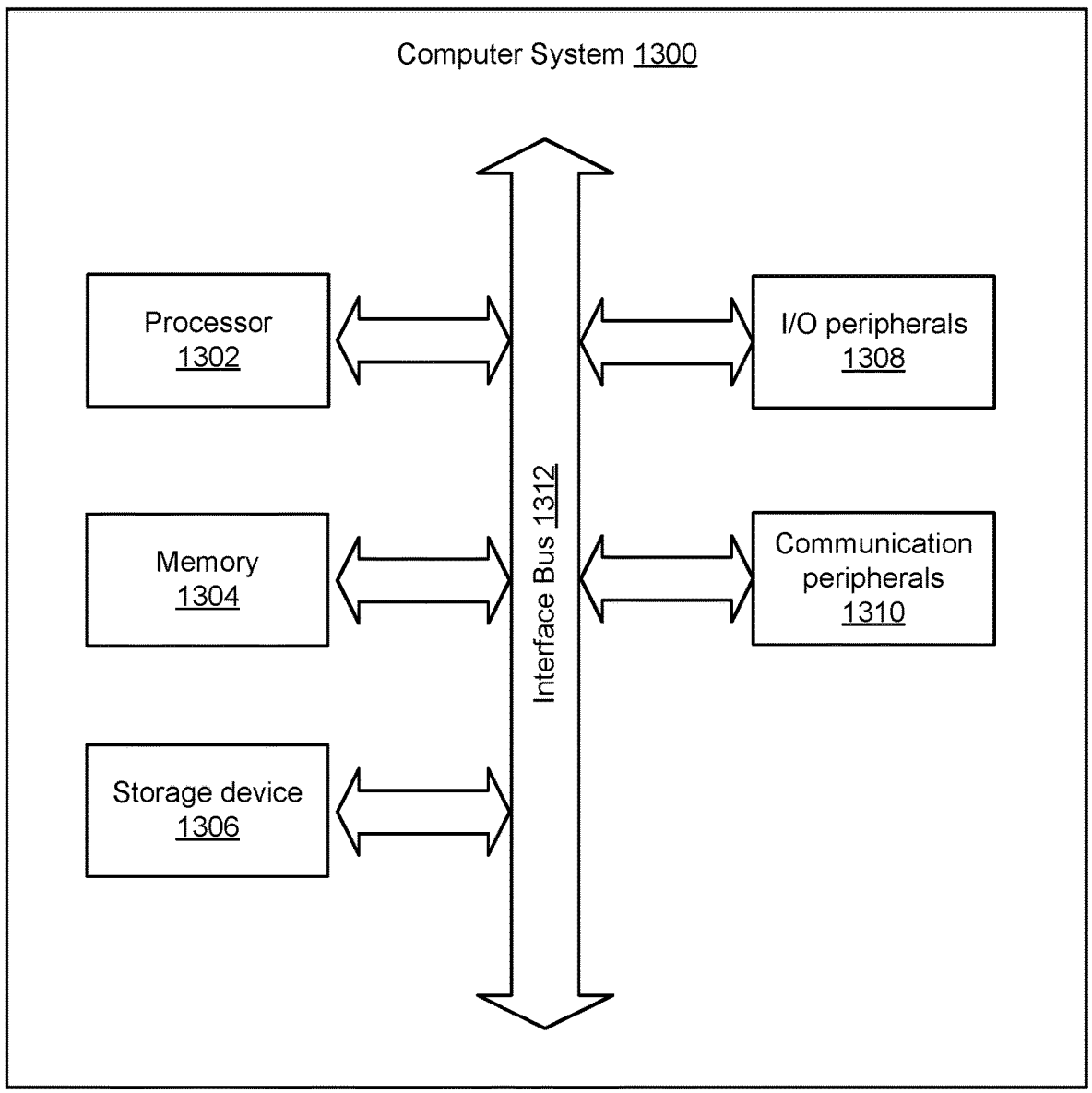
FIG. 13 illustrates examples of components of a computer system, according to certain embodiments of the present disclosure.

FIG. 13 illustrates examples of components of a computer system 1000, according to certain embodiments of the present disclosure. The computer system 1300 includes at least a processor 1302, a memory 1304, a storage device 1306, I/O peripherals 1308, communication peripherals 1310, and an interface bus 1312. The interface bus 1312 is configured to communicate, transmit, and transfer data, controls, and commands among the various components of the computer system 1300. The memory 1304 and the storage device 1306 include computer-readable storage media, such as RAM, ROM, electrically erasable programmable read-only memory (EEPROM), hard drives, CD-ROMs, optical storage devices, magnetic storage devices, electronic non-volatile computer storage, for example Flash® memory, and other tangible storage media. Any of such computer-readable storage media can be configured to store instructions or program codes embodying aspects of the disclosure. The memory 1304 and the storage device 1306 also include computer-readable signal media. A computer-readable signal medium includes a propagated data signal with computer-readable program code embodied therein. Such a propagated signal takes any of a variety of forms including, but not limited to, electromagnetic, optical, or any combination thereof. A computer-readable signal medium includes any computer-readable medium that is not a computer-readable storage medium and that can communicate, propagate, or transport a program for use in connection with the computer system 1300.

Further, the memory 1304 includes an operating system, programs, and applications. The processor 1302 is configured to execute the stored instructions and includes, for example, a logical processing unit, a microprocessor, a digital signal processor, and other processors. The memory 1304 and/or the processor 1302 can be virtualized and can be hosted within another computing system of, for example, a cloud network or a data center. The I/O peripherals 1308 include user interfaces, such as a keyboard, screen (e.g., a touch screen), microphone, speaker, other input/output devices, and computing components, such as graphical processing units, serial ports, parallel ports, universal serial buses, and other input/output peripherals. The I/O peripherals 1308 are connected to the processor 1302 through any of the ports coupled to the interface bus 1312. The communication peripherals 1310 are configured to facilitate communication between the computer system 1300 and other computing devices over a communications network and include, for example, a network interface controller, modem, wireless and wired interface cards, antenna, and other communication peripherals.

While the present subject matter has been described in detail with respect to specific embodiments thereof, it will be appreciated that those skilled in the art, upon attaining an understanding of the foregoing may readily produce alterations to, variations of, and equivalents to such embodiments. Accordingly, it should be understood that the present disclosure has been presented for purposes of example rather than limitation, and does not preclude inclusion of such modifications, variations, and/or additions to the present subject matter as would be readily apparent to one of ordinary skill in the art. Indeed, the methods and systems described herein may be embodied in a variety of other forms; furthermore, various omissions, substitutions and changes in the form of the methods and systems described herein may be made without departing from the spirit of the present disclosure. The accompanying claims and their equivalents are intended to cover such forms or modifications as would fall within the scope and spirit of the present disclosure.

Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provide a result conditioned on one or more inputs. Suitable computing devices include multipurpose microprocessor-based computing systems accessing stored software that programs or configures the computing system from a general purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

Conditional language used herein, such as, among others, "can," "could," "might," "may," "e.g.," and the like, unless specifically stated otherwise, or otherwise understood within the context as used, is generally intended to convey that certain examples include, while other examples do not include, certain features, elements, and/or steps. Thus, such conditional language is not generally intended to imply that features, elements and/or steps are in any way required for one or more examples or that one or more examples necessarily include logic for deciding, with or without author input or prompting, whether these features, elements and/or steps are included or are to be performed in any particular example.

The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Similarly, the use of "based at least in part on" is meant to be open and inclusive, in that a process, step, calculation, or other action "based at least in part on" one or more recited conditions or values may, in practice, be based on additional conditions or values beyond those recited. Headings, lists, and numbering included herein are for ease of explanation only and are not meant to be limiting.

The various features and processes described above may be used independently of one another, or may be combined in various ways. All possible combinations and sub-combinations are intended to fall within the scope of the present disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed examples. Similarly, the example systems and components described herein may be configured differently than described. For example, elements may be added to, removed from, or rearranged compared to the disclosed examples.

The invention claimed is:

1. A computer-implemented method for patch-based image inpainting, comprising:
    receiving, by a computer system, an image comprising a region of interest and content outside the region of interest;
    generating, by the computer system, a first patch centered around a first pixel inside the region of interest and a second patch centered around a second pixel outside the region of interest;
    generating, by the computer system by at least inputting the image to a neural network, a first code vector for the first pixel and a second code vector for the second pixel, wherein the first code vector comprises a feature that is descriptive of the first patch;
    associating, by the computer system, the first pixel with the second patch based on a similarity measure between the first code vector and the second code vector;
    determining, by the computer system, an overlapping patch that comprises the first pixel, wherein the overlapping patch is centered around a third pixel inside the region of interest and overlaps with the first patch, and wherein the third pixel is associated with a fourth patch centered around a fourth pixel outside the region of interest; and
    generating, by the computer system by at least inputting the second patch and the fourth patch to the neural network, a pixel value for the first pixel based on a weighted combination of pixel values from the content in the second patch and the fourth patch, wherein the weighted combination is learned by the neural network.

2. The computer-implemented method of claim 1, wherein the region of interest comprises a hole in the image, and wherein content of the hole is filled based on the pixel value of the first pixel.

3. The computer-implemented method of claim 1, wherein the neural network comprises a first neural network that is trained to output code vectors for pixels in the image, and wherein an input to the first neural network comprises the image.

4. The computer-implemented method of claim 3, further comprising training the first neural network by at least:
inputting a training image to the first neural network, wherein the training image comprises a training region of interest;
generating, by the first neural network, patches corresponding to pixels of the training image;
generating, by the first neural network, code vectors corresponding to the patches and associated with the pixels;
selecting, by the first neural network, a pair of code vectors, wherein the pair comprises one code vector associated with a pixel inside the training region of interest and another code vector associated with another pixel outside the training region of interest;
determining a similarity measure between the code vectors in the pair; and
updating a loss function of the first neural network based on a comparison of the similarity measure between the code vectors in the pair and a ground truth similarity measure between the code vectors in the pair.

5. The computer-implemented method of claim 3, wherein the neural network further comprises a second neural network that is trained to output pixel values for pixels inside the region of interest, and wherein an input to the second neural network comprises patches that are outside the region of interest and that are associated with a same pixel inside the region of interest.

6. The computer-implemented method of claim 5, further comprising training the second neural network by at least:
inputting training patches from a training image to the second neural network, wherein the training image comprises a training region of interest, wherein the training patches are located outside the training region of interest and are associated with a pixel inside the training region of interest;
generating, by the second neural network, a weighted combination from pixel values in the training patches; and
updating a loss function of the second neural network based on a comparison of the weighted combination from the pixel values and a ground truth pixel value of the pixel inside the training region of interest.

7. The computer-implemented method of claim 1, wherein the first patch is a k×k×3 patch, and wherein the first code vector is a d×1 vector, wherein each of k and d is a positive integer number.

8. The computer-implemented method of claim 7, wherein the similarity measure comprises a cosine similarity between the first code vector and the second code vector.

9. A computer system comprising:
a processor; and
a memory storing computer-readable instructions that, upon execution by the processor, cause the computer system to perform operations comprising:
receiving an image that comprises a region of interest and content outside the region of interest;
generating a first patch centered around a first pixel inside the region of interest and a second patch centered around a second pixel outside the region of interest;
generating, by at least inputting the image to a neural network hosted on the computer system, a first code vector for the first pixel and a second code vector for the second pixel, wherein the first code vector comprises a feature that is descriptive of the first patch;
associating the first pixel with the second patch based on a similarity measure between the first code vector and the second code vector; and
in response to the associating, generating a pixel value for the first pixel based on the content in the second patch.

10. The computer system of claim 9, wherein generating the pixel value for the first pixel comprises:
determining an overlapping patch that comprises the first pixel, wherein the overlapping patch is centered around a third pixel inside the region of interest and overlaps with the first patch, and wherein the third pixel is associated with a fourth patch centered around a fourth pixel outside the region of interest; and
generating, by at least inputting the second patch and the fourth patch to the neural network, the pixel value for the first pixel based on a weighted combination of pixel values from the content in the second patch and the fourth patch, wherein the weighted combination is learned by the neural network.

11. The computer system of claim 9, wherein generating the pixel value for the first pixel comprises:
determining an overlapping patch that comprises the first pixel, wherein the overlapping patch is centered around a third pixel inside the region of interest and overlaps with the first patch, and wherein the third pixel is associated with a fourth patch centered around a fourth pixel outside the region of interest; and
generating the pixel value for the first pixel by at least averaging pixel values from the content in the second patch and the fourth patch.

12. The computer system of claim 9, wherein the similarity measure comprises a cosine similarity between the first code vector and the second code vector.

13. The computer system of claim 9, wherein the neural network is trained to output code vectors for pixels in the image, and wherein an input to the neural network comprises the image.

14. The computer system of claim 13, wherein the operations further comprise training the neural network by at least:
inputting a training image to the neural network, wherein the training image comprises a training region of interest;
generating, by the neural network, code vectors corresponding to training patches in the training image and associated with the pixels;
determining similarity measures between pairs of code vectors; and
updating a loss function of the neural network based on a comparison of the similarity measures and ground truth similarity measures.

15. The computer system of claim 14, wherein determining the similarity measures comprise:
randomly selecting, by the neural network, a pair of code vectors, wherein the pair comprises one code vector associated with a pixel inside the training region of interest and another code vector associated with another pixel outside the training region of interest; and
determining a similarity measure between the code vectors in the pair.

16. A non-transitory computer-readable storage medium comprising instructions that, upon execution on a computer system, cause the computer system to perform operations comprising:
receiving an image that comprises a region of interest and content outside the region of interest;

determining, for a first pixel inside the region of interest, a first patch that is centered around the first pixel and a second patch that comprises the first pixel, wherein the second patch is centered around a second pixel inside the region of interest and overlaps with the first patch;

determining that the first pixel is associated with a third patch and that the second pixel is associated with a fourth patch, wherein the third patch is centered around a third pixel outside the region of interest, and wherein the fourth patch is centered around a fourth pixel outside the region of interest; and generating, by at least inputting the third patch and the fourth patch to a neural network hosted on the computer system, a pixel value for the first pixel based on a weighted combination of pixel values from the content in the third patch and the fourth patch, wherein the weighted combination is learned by the neural network.

17. The non-transitory computer-readable storage medium of claim 16, wherein the operations further comprise:

generating, by at least inputting the image to the neural network, a first code vector for the first pixel and a second code vector for the third pixel, wherein the first code vector comprises features that are learned by the neural network and that are descriptive of the first patch; and associating the first pixel with the third patch based on a similarity measure between the first code vector and the second code vector.

18. The non-transitory computer-readable storage medium of claim 16, wherein the weighted combination is based on a number of weights, wherein the number of weights depends on a size of the first patch.

19. The non-transitory computer-readable storage medium of claim 18, wherein the weighted combination is further based on pixel locations in the third patch and the fourth patch, wherein the pixel locations are associated with the first pixel inside the region of interest.

20. The non-transitory computer-readable storage medium of claim 16, wherein the operations further comprise training the neural network by at least:

inputting training patches from a training image to the neural network, wherein the training image comprises a training region of interest, wherein the training patches are located outside the training region of interest and are associated with a pixel inside the training region of interest;

generating, by the neural network, a weighted combination from pixel values in the training patches; and updating a loss function of the neural network based on a comparison of the weighted combination from the pixel values and a ground truth pixel value of the pixel inside the training region of interest.

* * * * *